(12) United States Patent
Shimazu

(10) Patent No.: US 10,140,431 B2
(45) Date of Patent: Nov. 27, 2018

(54) FILE MANAGEMENT SYSTEM AND USER TERMINAL IN FILE MANAGEMENT SYSTEM

(71) Applicant: NEC Solution Innovators, Ltd., Tokyo (JP)

(72) Inventor: Hideo Shimazu, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 267 days.

(21) Appl. No.: 14/917,332

(22) PCT Filed: Sep. 11, 2014

(86) PCT No.: PCT/JP2014/004670
§ 371 (c)(1),
(2) Date: Mar. 8, 2016

(87) PCT Pub. No.: WO2015/045302
PCT Pub. Date: Apr. 2, 2015

(65) Prior Publication Data
US 2016/0224765 A1    Aug. 4, 2016

(30) Foreign Application Priority Data
Sep. 25, 2013 (JP) .................... 2013-198689

(51) Int. Cl.
*G06F 21/60* (2013.01)
*G06F 21/10* (2013.01)
*G06F 21/62* (2013.01)

(52) U.S. Cl.
CPC ........... *G06F 21/10* (2013.01); *G06F 21/602* (2013.01); *G06F 21/62* (2013.01); *G06F 2221/0724* (2013.01)

(58) Field of Classification Search
CPC ...................................... G06F 21/10
See application file for complete search history.

(56) References Cited

U.S. PATENT DOCUMENTS

| 2010/0023520 A1* | 1/2010 | Barboy | ............... G06F 17/3023 707/E17.007 |
| 2010/0250926 A1* | 9/2010 | Ji | ............... G06F 21/10 713/165 |
| 2011/0061110 A1 | 3/2011 | Koeten et al. | |

FOREIGN PATENT DOCUMENTS

| CN | 101158996 A | 4/2008 |
| CN | 101377802 A | 3/2009 |

(Continued)

OTHER PUBLICATIONS

Japanese Office Action for JP Application No. 2015-538869 dated Aug. 16, 2016 with English Translation.

(Continued)

*Primary Examiner* — Josnel Jeudy

(57) ABSTRACT

[Problem] The present invention attempts, using a terminal that does not have digital rights management (DRM) as a base, to generate encapsulated files from original files, by adding access rights thereto and encrypting the same, while ensuring not to leave unprocessed original files. [Solution] A file management system has an intranet having data storage means, an encapsulation server, and a user terminal that is capable of accessing the intranet and the encapsulation server. The user terminal has encapsulation request means that transmits an original file and access rights information to the encapsulation server and receives an encapsulated file, for which encapsulation has been completed. The user terminal has encapsulated file saving means that saves the encapsulated file in the data storage means, and automatic original file deletion means that deletes the original file upon saving of the encapsulated file.

6 Claims, 17 Drawing Sheets

(56) References Cited

FOREIGN PATENT DOCUMENTS

| CN | 102597947 A | 7/2012 |
|---|---|---|
| JP | 2006-048220 A | 2/2006 |
| JP | 2008-123049 A | 5/2008 |
| JP | 2010-505206 A | 2/2010 |
| JP | 2010-117983 A | 5/2010 |
| JP | 2011-170715 A | 9/2011 |
| JP | 2013-504136 A | 2/2013 |
| WO | 2011/032001 A1 | 3/2011 |

OTHER PUBLICATIONS

International Search Report for PCT Application No. PCT/JP2014/004670, dated Dec. 16, 2014.
English translation of Written opinion for PCT Application No. PCT/JP2014/004670.
Chinese Office Action for CN Application No. 201480052681.4 dated Feb. 5, 2018 with English Translation.

\* cited by examiner

Fig. 2

| USER ID | ACCESS RIGHTS | PASSWORD |
|---|---|---|
| Shimazu | ALL OPERATIONS | Pw1 |
| Yamada | READ, EDIT, DELETE, ENCAPSULATE | Pw2 |
| Takahashi | READ, EDIT | Pw3 |
| Kimura | READ | Pw4 |
| Suzuki | READ | Pw5 |

Fig. 3

| USER ID | PASSWORD |
|---|---|
| Shimazu | Pw1 |
| Yamada | Pw2 |
| Takahashi | Pw3 |
| Kimura | Pw4 |
| Suzuki | Pw5 |

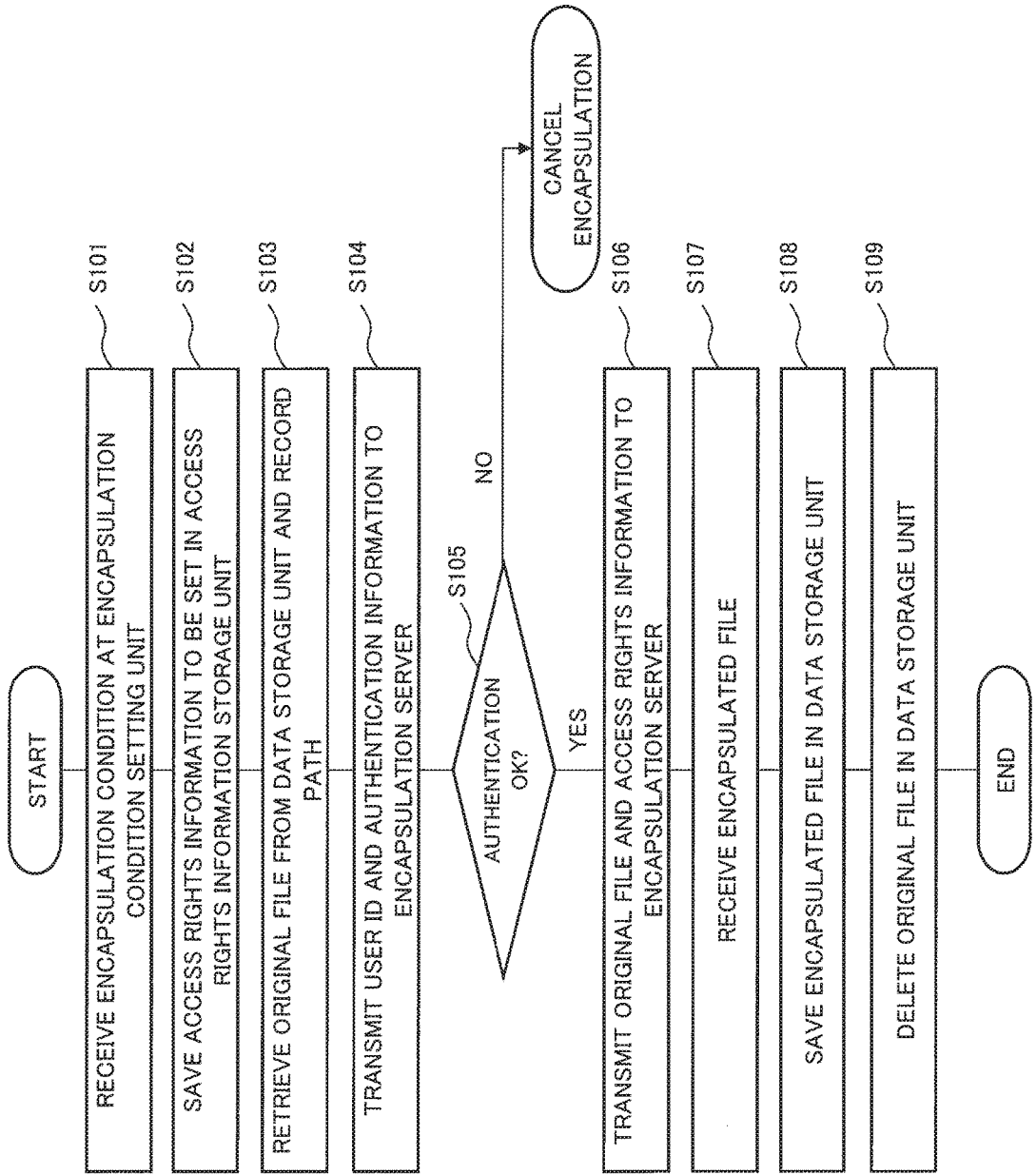

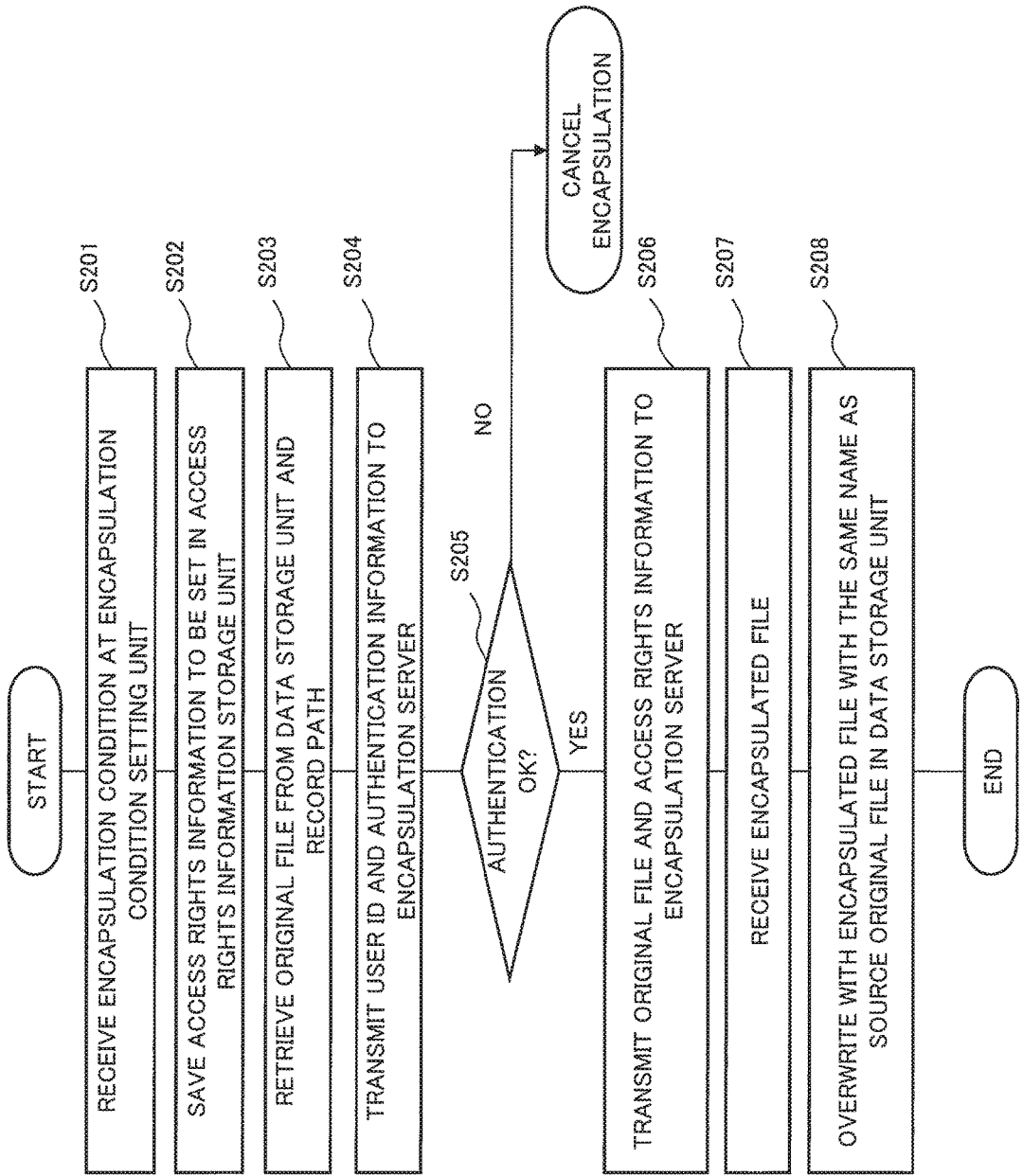

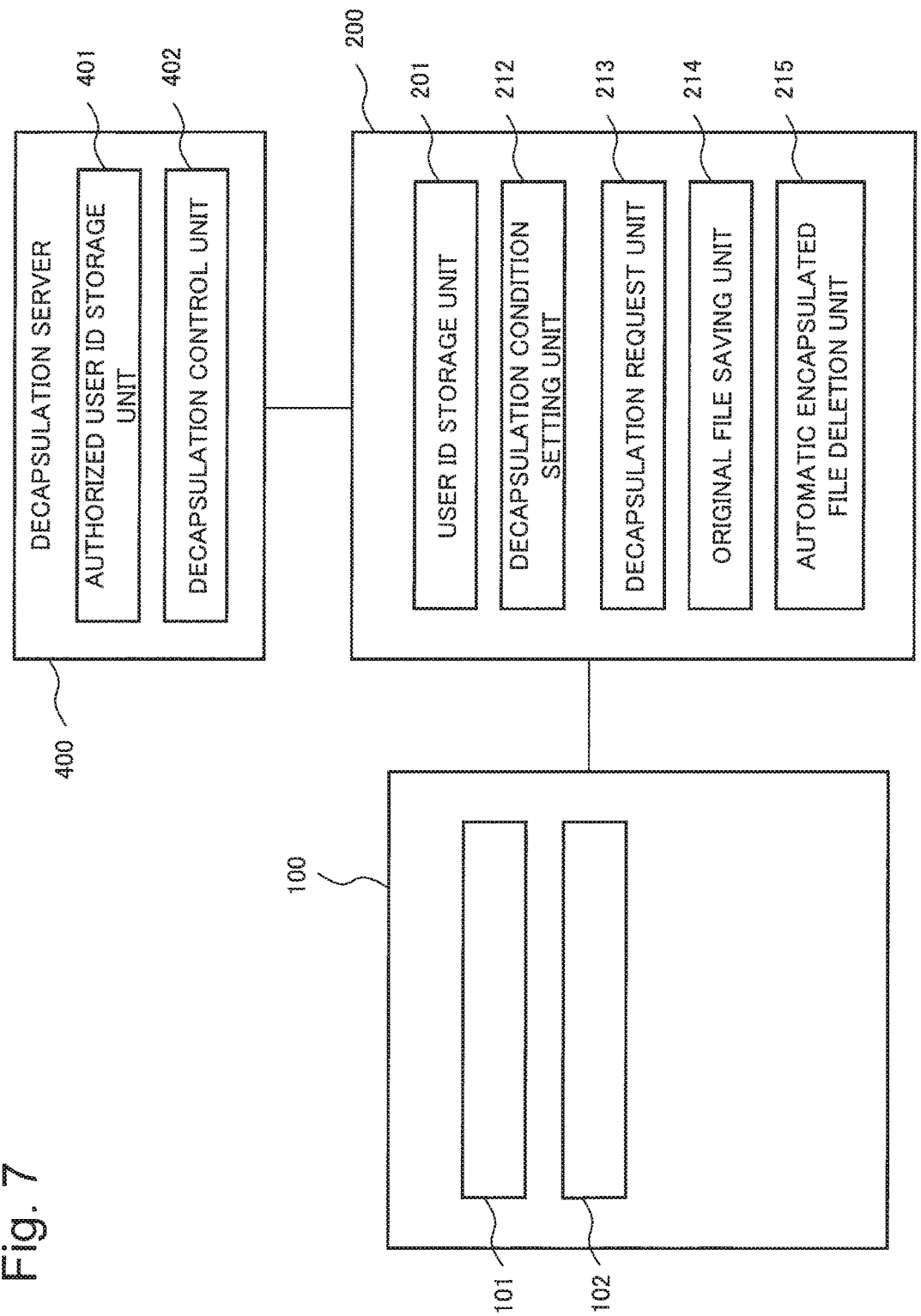

FILE MANAGEMENT SYSTEM AND USER TERMINAL IN FILE MANAGEMENT SYSTEM

This application is a National Stage Entry of PCT/JP2014/004670 filed on Sep. 11, 2014, which claims priority from Japanese Patent Application 2013-198689 filed on Sep. 25, 2013, the contents of all of which are incorporated herein by reference, in their entirety.

TECHNICAL FIELD

The present invention relates to a file management system and a user terminal used in the file management system.

BACKGROUND ART

In companies, vast amounts of electronic files (hereinafter, referred to as files) are generated and stored in PCs (personal computers) and file servers and circulated. Those files include a huge amount of highly confidential information. For example, there are spreadsheet data that describes a price list of unreleased products, a word processor file that describes personnel information and the like, a presentation file that describes public relations materials before publication, an e-mail that describes correspondence of confidential information with regard to cooperation with other company, and the like.

However, those files are not always sufficiently managed in reality, thereby increasing the risk of information leakage in the companies. In consideration of this, as a method for solving such a problem, a mechanism in which files "protect themselves" has come to be employed. This mechanism is Digital Rights Management (DRM). DRM has originally been promoted as a mechanism where pay contents, such as movie contents and music contents, are transacted with small amounts of accounts, which is then applied in file management in companies.

In common DRM, a file creator sets access rights for the file. Then, the file and the access rights information are collectively encrypted. This operation is hereinafter referred to as "encapsulation." Further, the access rights regulate people who can use the file and operations that the people can execute to the file. Specifically, for example, there may be read only, editable/changeable, permission for all rights, or the like.

When a user uses an encapsulated file, an encapsulation server releases encapsulation after verifying the access rights of the user and returns the file, of which encapsulation was released, to the user. Hereinafter, this release operation is referred to as "decapsulation." A user can execute file operations according to the access rights that the user possesses.

It should be noted that, to utilize the above-described common DRM, a user terminal should embed a DRM function for executing the DRM. If the DRM function is not embedded, the user terminal cannot use the files under the management of the DRM.

However, with recent development of cloud environment, there is increasing demand for using the files managed by DRM even from terminals that do not have a DRM function. For example, establishment of a method that enables encapsulation and decapsulation of files from terminals that do not have a DRM function, such as smartphones, tablet PCs, and public computers, is desired.

Various techniques for solving this problem has been considered. The method of encapsulating files is disclosed, for example, in PTL 1. In this method, the encapsulation server substitutionally performs encapsulation in response to a request from a user terminal. When a user terminal transmits an original file and access rights information, as a set, to the encapsulation server, the encapsulation server generates and returns an encapsulated file, whereby the user terminal can receive the encapsulated file. Although PTL 1 does not have a presupposition of a user terminal without a DRM function, by applying this technique, encapsulation is made possible from a user terminal without a DRM function.

Whereas, for decapsulation, for example, PTL 2 discloses a method of using an encapsulated file in a terminal that does not have a DRM function. Using this technique, an encapsulated file can be read even from a terminal without a DRM function. The process is as follows:
1) First, a user transmits an encapsulated file and the user's access rights information to the encapsulation server.
2) The encapsulation server checks whether the user has the access rights.
3) If the access rights are confirmed, the encapsulation is released and the inside file is converted to a format viewable for the user. This format is read only, where operations, such as copying, pasting, printing, changing, and image capturing, cannot be performed at all. This format allows only reading even for users who have higher authorization than reading, such as editing. It should be noted that if the access rights are not confirmed, the request is rejected and the encapsulation is not released.

As described above, according to PTL 1 and PTL 2, encapsulation of a file and reading of an encapsulated file under DRM is possible even using a terminal without a DRM function.

Further, PTL 3 and PTL 4 also disclose relevant techniques.

CITATION LIST

Patent Literature

[PTL 1] Japanese Unexamined Patent Application Publication No. 2010-117983
[PTL 2] Japanese Translation of PCT International Application Publication No. 2013-504136
[PTL 3] Japanese Translation of PCT International Application Publication No. 2010-505206
[PTL 4] Japanese Unexamined Patent Application Publication No. 2008-123049

SUMMARY OF INVENTION

Technical Problem

However, these techniques respectively have problems.
The problem of the technique of PTL 1 is that an original file as the source of an encapsulated file is left out as is in a user terminal. The remaining original file might cause information to be stolen if there is unauthorized access. While there is no problem as long as the user deletes the original file, there is a risk of neglecting or forgetting deletion.

Further, the technique of PTL 2 has a problem that users cannot perform operations other than reading files. In companies, there are numerous needs of a plurality of users editing files and changing the attributes of the files. The technique of PTL 2 cannot address these needs.

The present invention is made in consideration of the above problem and aims to provide a method of enabling encapsulation and decapsulation of files using a terminal without a DRM function. Further, the present invention also aims to provide a method of enabling operations other than reading for decapsulated files, as well as, provide a method of decreasing an information leakage risk.

Solution to Problem

In order to solve the above problem, the file management system of the present invention has: an intranet including data storage means; an encapsulation server that generates an encapsulated file by collectively encrypting an original file and access rights information for the original file; and a user terminal that can access the intranet and the encapsulation server, wherein the encapsulation server has encapsulation control means that receives the original file and the access rights information from the user terminal, generates the encapsulated file, and returns the encapsulated file to the user terminal, and the user terminal has encapsulation condition setting means that sets an encapsulation condition, encapsulation request means that requests encapsulation to the encapsulation server, encapsulated file saving means that saves the returned encapsulated file in the data storage means, and automatic file deletion means that, upon saving of the encapsulated file, automatically deletes the original file that was stored in the file storage means.

Advantageous Effects of Invention

The effect of the present invention is to prevent information leakage using a terminal that does not have DRM as a base. This attributes to encapsulation of original files and automatic deletion of the original files.

BRIEF DESCRIPTION OF DRAWINGS

FIG. 2 is an example of access rights that are used in the second exemplary embodiment of the present invention;

FIG. 3 is an example of authentication information that is used in the second exemplary embodiment of the present invention;

FIG. 4 is a flowchart illustrating an operation of the second exemplary embodiment of the present invention;

FIG. 6 is a flowchart illustrating an operation of a third exemplary embodiment of the present invention;

FIG. 7 is a block diagram illustrating a fourth exemplary embodiment of the present invention;

DESCRIPTION OF EMBODIMENTS

The following will describe the details of the exemplary embodiments of the present invention with reference to the drawings.

First Exemplary Embodiment

Figure 16:
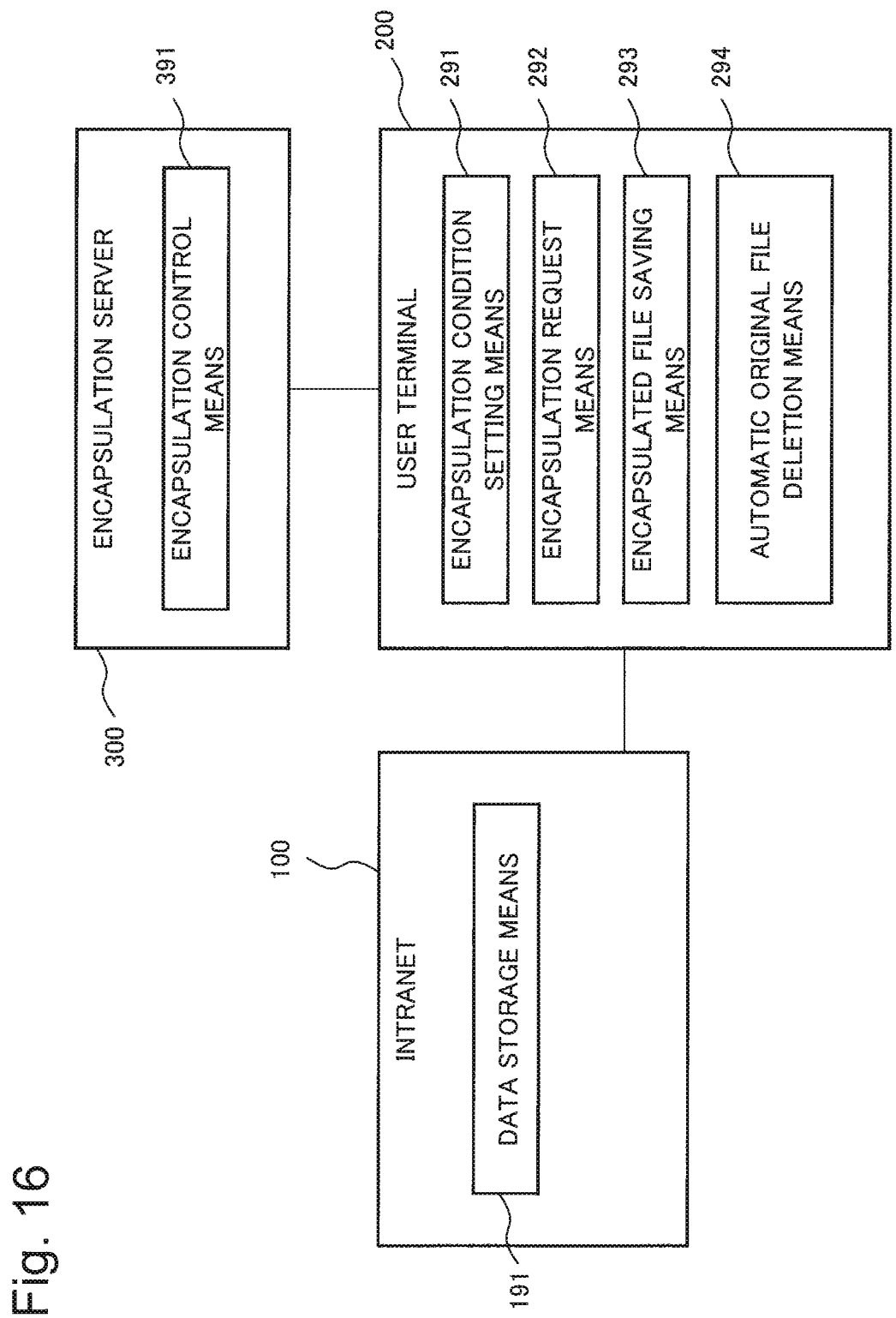
FIG. 16 is a block diagram illustrating a first exemplary embodiment of the present invention.

FIG. 16 is a block diagram illustrating a first exemplary embodiment of the present invention. The file management system has an intranet 100, an encapsulation server 300, and a user terminal 200 that can access the intranet 100 and the encapsulation server 300.

The intranet 100 has data storage means 191 that stores data.

The encapsulation server 300 has encapsulation control means 391 that generates an encapsulated file by collectively encrypting an original file and access rights information for the original file. The encapsulation control means 391 receives an original file and access rights information from the user terminal 200, generates an encapsulated file, and returns the generated encapsulated file to the user terminal 200. Here, the access rights information is information that regulates to whom and what kind of operation is permitted with regard to the original file.

The user terminal 200 has encapsulation condition setting means 291 that sets an encapsulation condition and encapsulation request means 292 that requests encapsulation to the encapsulation server 300. The encapsulation condition setting means 291 sets access rights information to be assigned to the original file. The user terminal 200 also has encapsulated file saving means 293 that saves an encapsulated file, which was received from the encapsulation server 300, in the data storage means 191. Further, the user terminal 200 has automatic original file deletion means 294 that, upon saving of the encapsulated file, automatically deletes the original file stored in the data storage means 191.

As described above, according to the first exemplary embodiment, an original file can be encapsulated and the source original file can be automatically deleted using a terminal without DRM as a base. Thus, information leakage can be prevented.

Second Exemplary Embodiment

Figure 1:
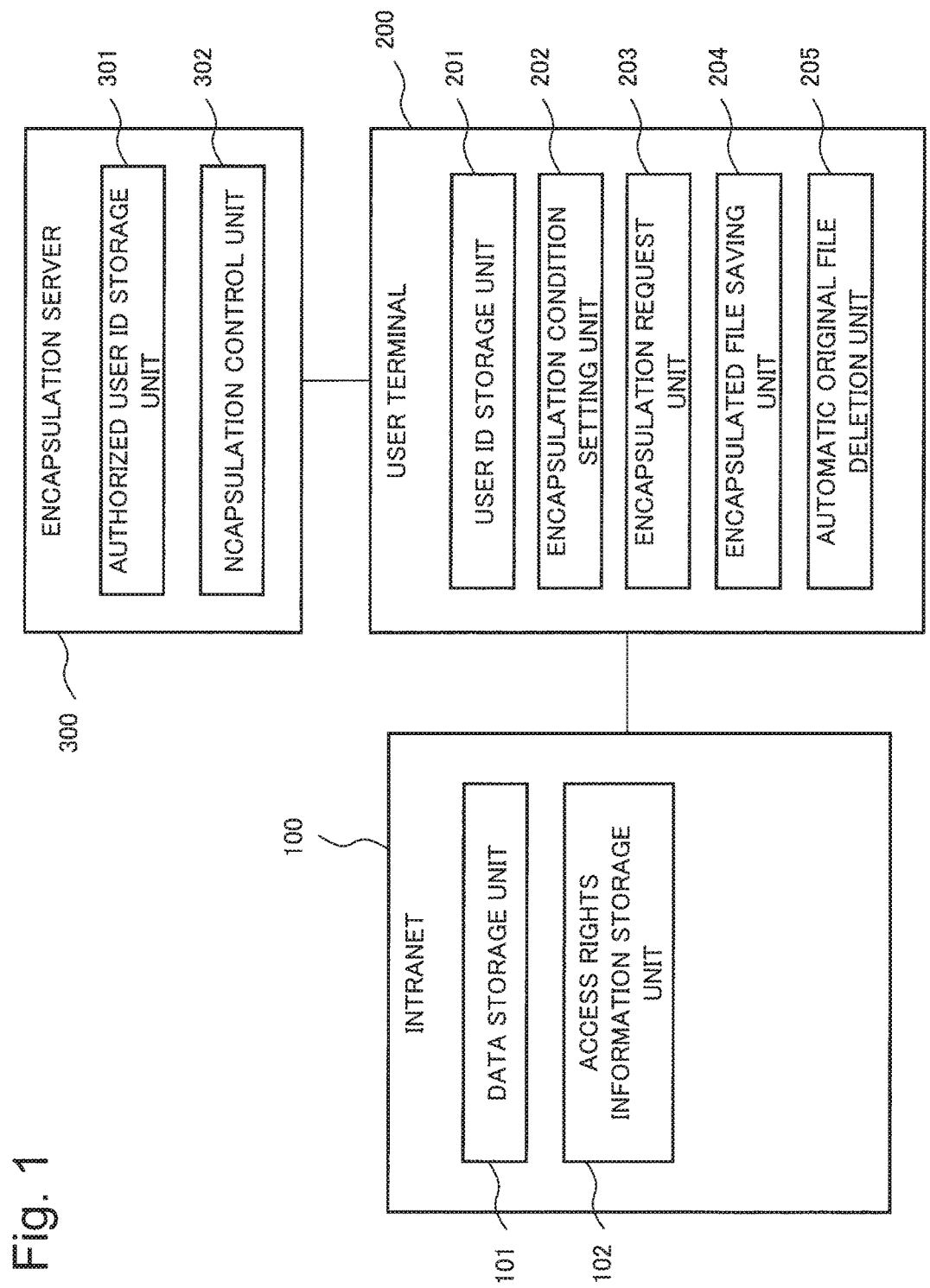
FIG. 1 is a block diagram illustrating a second exemplary embodiment of the present invention.

FIG. 1 is a block diagram illustrating a file management system of a second exemplary embodiment. The second exemplary embodiment illustrates the details of the configuration and operation of the file management system.

The intranet 100 is equipped with a data storage unit 101 and an access rights information storage unit 102. Further, the user terminal 200 is connected to the intranet 100. Further, the encapsulation server 300 is located on a network, such as the Internet or intranet. The user terminal 200 is equipped with a user ID storage unit 201, an encapsulation condition setting unit 202, an encapsulation request unit 203, an encapsulated file saving unit 204, and an automatic original file deletion unit 205. Here, an ID is an abbreviation of an identifier. The encapsulation server 300 is equipped with an authorized user ID storage unit 301 and an encapsulation control unit 302.

The data storage unit 101 is a storage within the intranet, which stores original files and encapsulated files.

The access rights information storage unit 102 stores the access rights information that is used when encapsulating original files. Here, the access rights regulate users who can access the relevant file and file operations that the users can exercise. FIG. 2 illustrates an example of an access rights setting list. The authorized users are five persons on the list, as for each access right, all operations are permitted for Shimazu, reading, editing, deleting and encapsulating are permitted for Yamada, reading and editing are permitted for Takahashi, and only reading is permitted for Kimura and Suzuki. It should be noted that these are only an example without limiting the application of the present invention by the setting method of access rights.

Referring back to FIG. 1, the encapsulation server 300 will be described. In response to a request from the outside, the encapsulation server 300 receives an original file and access rights information and generates and returns an encapsulated file. The encapsulation server 300 operates, for example, as an independent WEB server on the intranet or Internet. An encapsulation request from the encapsulation request unit 203 to the encapsulation server 300 is transmitted, for example, as a request on the Internet, which is received by the encapsulation server 300. As for the format of the request, for example, a HTTP (Hyper Text Transfer Protocol) format can be used.

The authorized user ID storage unit 301 stores IDs of users who can use the encapsulation server 300. In addition, authentication information, such as a password, is stored. Before executing encapsulation, the encapsulation control unit 302 refers to the authorized user ID storage unit 301 and determines whether or not the user is authorized to use the encapsulation server 300. It should be noted that to prevent masquerade, authentication information may be set, such as, for example, setting a password for each user ID as illustrated in FIG. 3. It should be noted that, while a password is used as an example, an arbitrary method may be used as necessary for authentication information.

The encapsulation control unit 302 generates an encapsulated file based on the received original file and access rights information and returns the encapsulated file to the user terminal 200.

The user terminal 200 is a terminal that can access the intranet and has a user ID storage unit 201, an encapsulation condition setting unit 202, an encapsulation request unit 203, an encapsulated file saving unit 204, and an automatic original file deletion unit 205. The user terminal 200 is specifically, for example, a smartphone or a tablet PC (Personal Computer) that does not have a DRM function. Alternatively, the user terminal 200 may have a DRM function, while not using the function in the second exemplary embodiment.

The user ID storage unit 201 retains a user ID that is necessary for using the encapsulation server and a password or the like that is necessary for authentication.

The encapsulation condition setting unit 202 is means, by which a user specifies an original file to be encapsulated and sets access rights for the original file.

The encapsulation request unit 203 is means that requests, to the encapsulation server 300, execution of encapsulation and returning of the encapsulated file in accordance with the set encapsulation condition. The encapsulation request unit 203 retrieves the original file from the data storage unit 101 and transmits the original file with the set access rights information to the encapsulation server 300. Further, the encapsulation request unit 203 has a function of establishing authentication by transmitting a user ID and necessary authentication information before the encapsulation request.

The encapsulated file saving unit 204 saves the encapsulated file that was returned from the encapsulation server 300 in the same path as the original file in the data storage unit 101.

Upon completion of saving of the encapsulated file, the automatic original file deletion unit 205 forcibly deletes the original file. In this way, the original file is replaced with the encapsulated file.

The following will describe an encapsulation operation in the second exemplary embodiment.

FIG. 4 is a flowchart illustrating the operation of the user terminal 200. It should be noted that the signs used in the description are the same as those of FIG. 1. A user inputs the name of an original file to be encapsulated and access rights information to be set. Having received the input (S101), the encapsulation condition setting unit 202 saves the access rights information in the access rights information storage unit 102 (S102). Next, the encapsulation request unit 203 retrieves the original file from the data storage unit 101 and records the path (S103). Next, the encapsulation request unit 203 retrieves the user ID and authentication information from the user ID storage unit 201 and transmits the same to the encapsulation server 300 (S104). If the authentication of the encapsulation server 300 is not established (S105_NO), the encapsulation is discontinued. If the authentication of the encapsulation server 300 succeeds (S105_YES), the original file and access rights information are transmitted to the encapsulation server 300 as a set (S106). When the encapsulation is completed and the encapsulated file is returned from the encapsulation server 300, the encapsulation request unit 203 receives the encapsulated file (S107). Next, the encapsulated file saving unit 204 saves the encapsulated file in the same path as the source original file in the data storage unit 101 (S108). When saving of the encapsulated file is completed, the automatic original file deletion unit 205 deletes the source original file (S109). As such, replacement of the original file and the encapsulated file is completed. It should be noted that the authentication of S104 to S105 can be performed at arbitrary timing between S101 and S 103 without any problems.

Figure 5A:
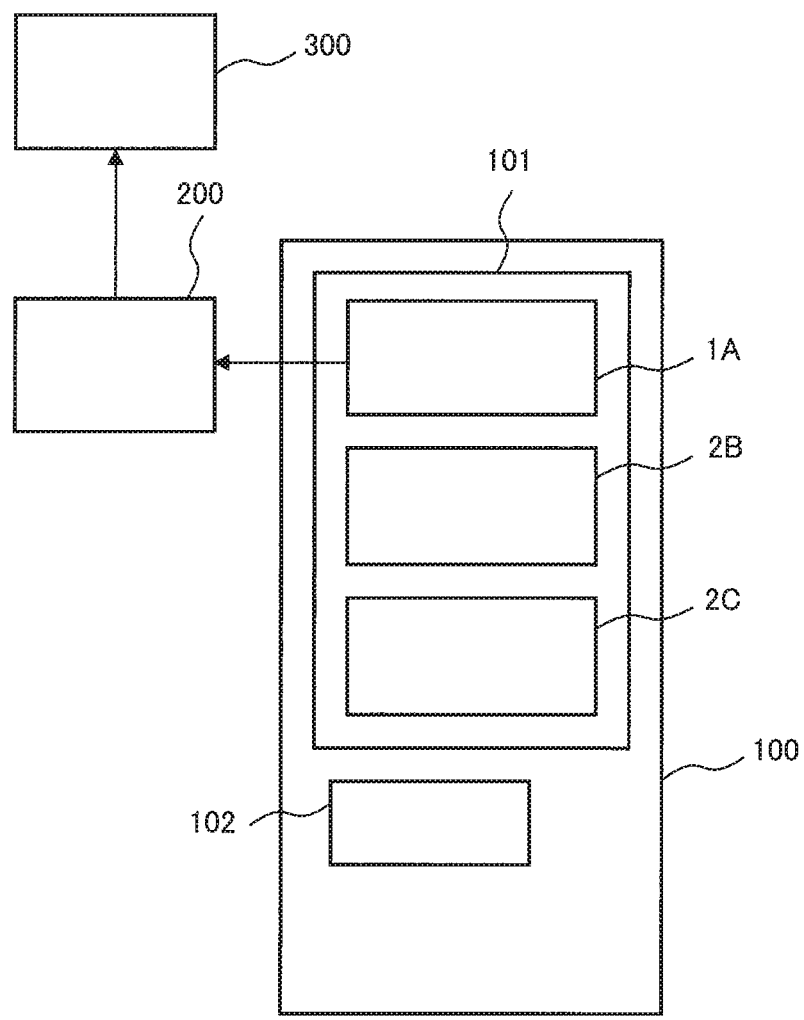
FIG. 5A is a block diagram illustrating a specific example of before processing of the second exemplary embodiment of the present invention.
Figure 5B:
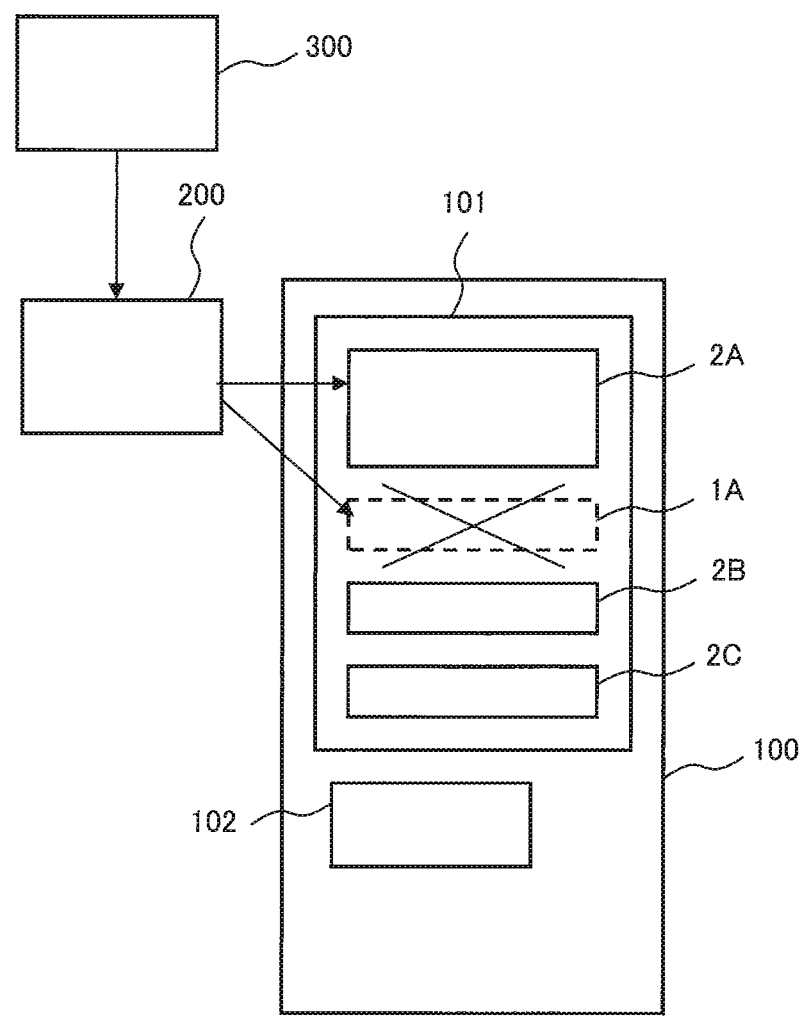
FIG. 5B is a block diagram illustrating a specific example of after processing of the second exemplary embodiment of the present invention.

The following will describe the overview of the second exemplary embodiment with a specific example. FIGS. 5A and 5B are block diagrams illustrating a specific example. In FIGS. 5A and 5B, the signs starting with 1 refer to an original file and the signs starting with 2 refer to an encapsulated file. FIG. 5A is an initial state where the data storage unit 101 stores an original file 1A and encapsulated files 2B, 2C. As illustrated by the arrows in FIG. 5A, the user terminal 200 requests encapsulation of 1A to the encapsulation server 300.

The encapsulation server 300 executes encapsulation and generates an encapsulated file 2A. Next, the encapsulation server 300 returns 2A to the user terminal 200.

When 2A is received by the user terminal 200, 2A is saved in the data storage unit 101 and the source original file 1A is deleted as illustrated by the arrows of FIG. 5B. By the above operation, in FIG. 5B, the data storage unit 101 retains only the encapsulated file 2, while the original file 1 no longer exists. As described above, according to the second exemplary embodiment, all the files stored in the data storage unit 101 can be converted to encapsulated files.

As described above, according to the second exemplary embodiment, original files can be completely deleted and the encapsulated files can be securely retained.

Third Exemplary Embodiment

While a third exemplary embodiment largely resembles the second exemplary embodiment, the methods of saving encapsulated files and deleting original files are different. FIG. 6 is a flowchart illustrating an operation of an encapsulation request unit 203 of the third exemplary embodiment. It should be noted that the signs used in the description are the same as those of FIG. 1.

S201 to S207 are the same as S101 to S107 of the first exemplary embodiment. In the third exemplary embodiment, when the encapsulated file is received (S207), the data storage unit 101 is overwritten with the encapsulated file with the same name as the original file 1 (S208). In this way, saving of the encapsulated file 2 and replacing with the original file 1 are completely and efficiently performed.

Fourth Exemplary Embodiment

A fourth exemplary embodiment enables a terminal without a DRM function to release encapsulation of an encapsulated file and to use the original file. The user terminal 200 requests decapsulation of an encapsulated file to a decapsulation server 300 and receives the original file, with which not only reading but also editing and the like can be performed.

FIG. 7 is a block diagram illustrating a system configuration of the fourth exemplary embodiment. The intranet 100 is equipped with a data storage unit 101 and an access rights information storage unit 102. These components are the same as the second and third exemplary embodiments. Further, the user terminal 200 is connected to the intranet 100. Further, a decapsulation server 400 is located on a network, such as the Internet or intranet. The decapsulation server 400 is equipped with an authorized user ID storage unit 401 and a decapsulation control unit 402.

In response to a request from the outside, the decapsulation server 400 releases encapsulation of an encapsulated file and generates the original file.

The authorized user ID storage unit 401 stores IDs of users who can use the decapsulation server 400 and authentication information thereof. When executing decapsulation, the decapsulation control unit 402 refers to the authorized user ID storage unit 401 to determine whether the user is authorized to use the decapsulation server 400. For determination, not only a user ID but also arbitrary authentication information can be used.

Having received the encapsulated file from a user, with whom authentication has been established, the decapsulation control unit 402 releases encapsulation and refers to the access rights information in the encapsulated file. If the user ID is confirmed as being assigned access rights with permission for all file operations (referred to as full access rights), the original file is retrieved from the encapsulated file and returned to the user.

The user terminal 200 is equipped with a user ID storage unit 201, a decapsulation condition setting unit 212, a decapsulation request unit 213, an original file saving unit 214, and an automatic encapsulated file deletion unit 215.

The decapsulation condition setting unit 212 is means, with which a user specifies files to be decapsulated.

The decapsulation request unit 213 transmits a user ID, necessary authentication information, and a copy of the encapsulated file stored in the data storage unit 101 to the decapsulation server 400 to request decapsulation.

The original file saving unit 214 saves the original file that was returned from the decapsulation server 400 in the same path as the source encapsulated file. When saving of the original file has been completed, the automatic encapsulated file deletion unit 215 forcibly deletes the source encapsulated file.

The following will describe a decapsulation operation of the fourth exemplary embodiment. When a user attempts to decapsulate an encapsulated file, the user specifies, with the decapsulation condition setting unit 212, the name of the file to be decapsulated. The decapsulation request unit 213 requests decapsulation of the specified encapsulated file to the decapsulation server 400.

Figure 8:
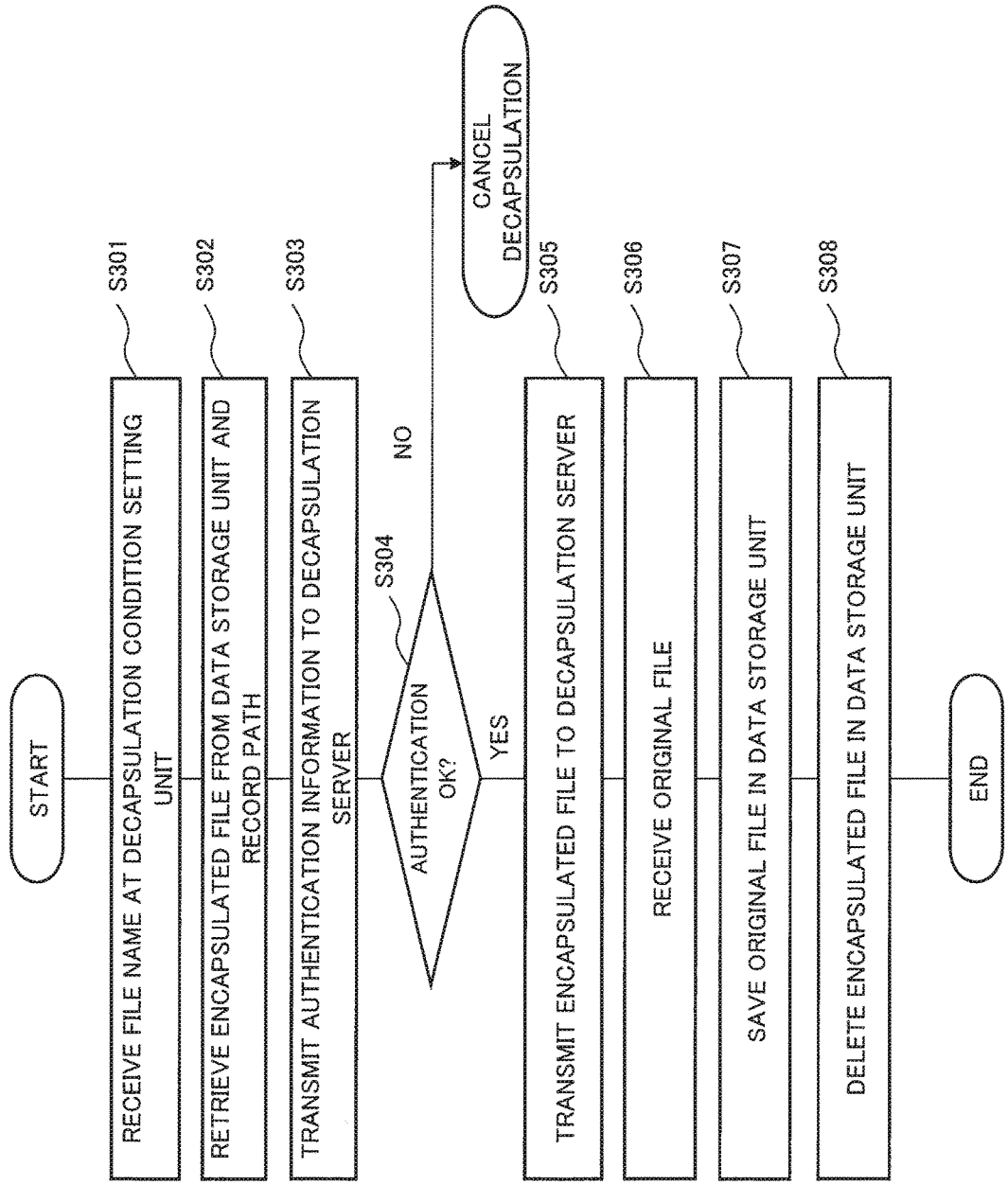
FIG. 8 is a flowchart illustrating an operation of a decapsulation request unit of the fourth exemplary embodiment of the present invention.

FIG. 8 is a flowchart illustrating an operation of the user terminal 200 in decapsulation. It should be noted that the signs used in the description are the same as those of FIG. 7. When a user specifies a file to be decapsulated, the decapsulation condition setting unit 212, first, receives this file name (S301). Next, the decapsulation request unit 213 retrieves the specified encapsulated file from the data storage unit 101 and records the path (S302). Next, a user ID and necessary authentication information are transmitted to the decapsulation server 400 (S303). If the authentication fails (S304_NO), the decapsulation is discontinued. If the authentication succeeds (S304_YES), the encapsulated file is transmitted to the decapsulation server 400 (S305). The decapsulation server 400 decrypts the encapsulated file and determines whether the user has authorization to perform all operations (full access rights). Then, if the user has full access rights, the original file is retrieved from the decrypted file and returned to the decapsulation request unit 213. The operation of the decapsulation server will be described later. Next, the decapsulation request unit 213 receives the original file (S306). Next, the original file saving unit 214 saves the received original file in the same path as the source encapsulated file (S307). When the saving has completed, the automatic encapsulated file deletion unit 215 deletes the source encapsulated file stored in the data storage unit 101 (S308). As such, the encapsulated file 2 is replaced with the original file 1, whereby the user can operate the original file 1 at will. Further, confusion caused by having two files under the same name can be avoided.

Figure 9:
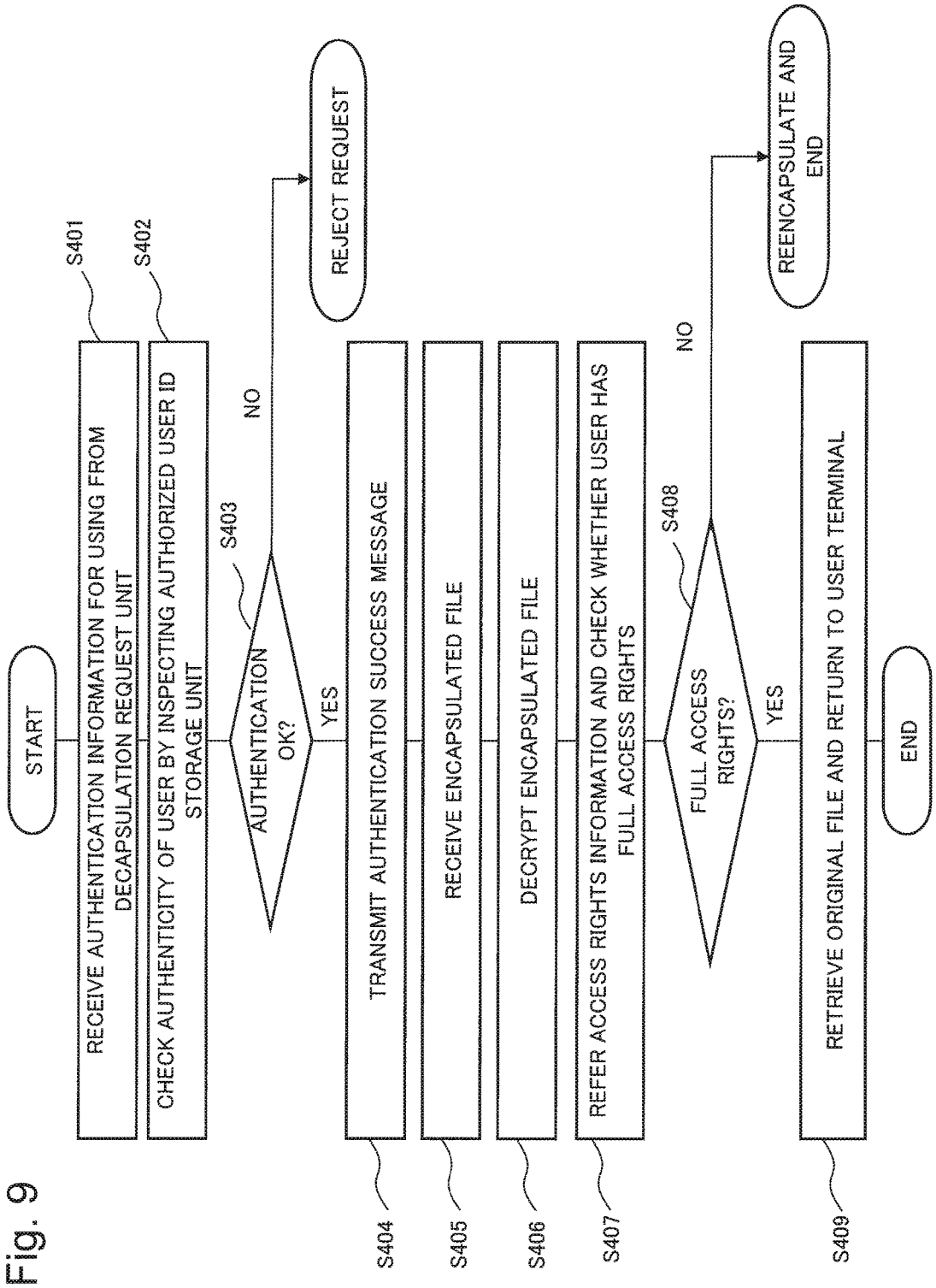
FIG. 9 is a flowchart illustrating an operation of a decapsulation server of the fourth exemplary embodiment of the present invention.

The following will describe the operation of the decapsulation server 400. FIG. 9 is a flowchart illustrating an operation of the decapsulation server 400. It should be noted that the signs of the respective units used in the description are the same as those of FIG. 7. First, authentication information for confirming user authentication for the decapsulation server is received (S401). Next, the decapsulation server 400 refers to the authorized user ID storage unit 401 and investigates the user's authenticity for the decapsulation server 400 (S402). If the user ID has not been registered (S403_NO), the decapsulation server 400 rejects the decapsulation request and ends the processing. If registration of the user ID is confirmed, the authentication is determined as OK (S403_YES), then, an authentication success message is transmitted (S404). Next, an encapsulated file is transmitted from the user terminal, and the decapsulation server 400 receives the encapsulated file (S405). Next, the decapsulation server 400 decrypts the encapsulated file (S406). Next, referring to the decrypted access rights information, whether the user has full access rights with permission for all operations is investigated (S407). If the user does not have full access rights (S408_NO), the decrypted file is reencapsulated and a decapsulation denied message is transmitted to the user terminal, then, the processing ends. The encapsulated file that has been reencapsulated is either deleted or returned to the decapsulation request unit 213. If the user is determined as having full access rights (S408_YES), the original file is retrieved from the decrypted file and returned to the user terminal.

As such, the user can receive the original file. Also, since only users with full access rights with permission for all operations are permitted to receive the original file, the range of users can be restricted to the minimum. Further, since the source encapsulated file is deleted, confusion of having two files under the same name can be avoided.

It should be noted that, in the same way as the second exemplary embodiment, overwriting the source encapsulated file 2 with the received original file with the same name can efficiently complete simultaneous saving and deleting of the files.

Fifth Exemplary Embodiment

Figure 10:
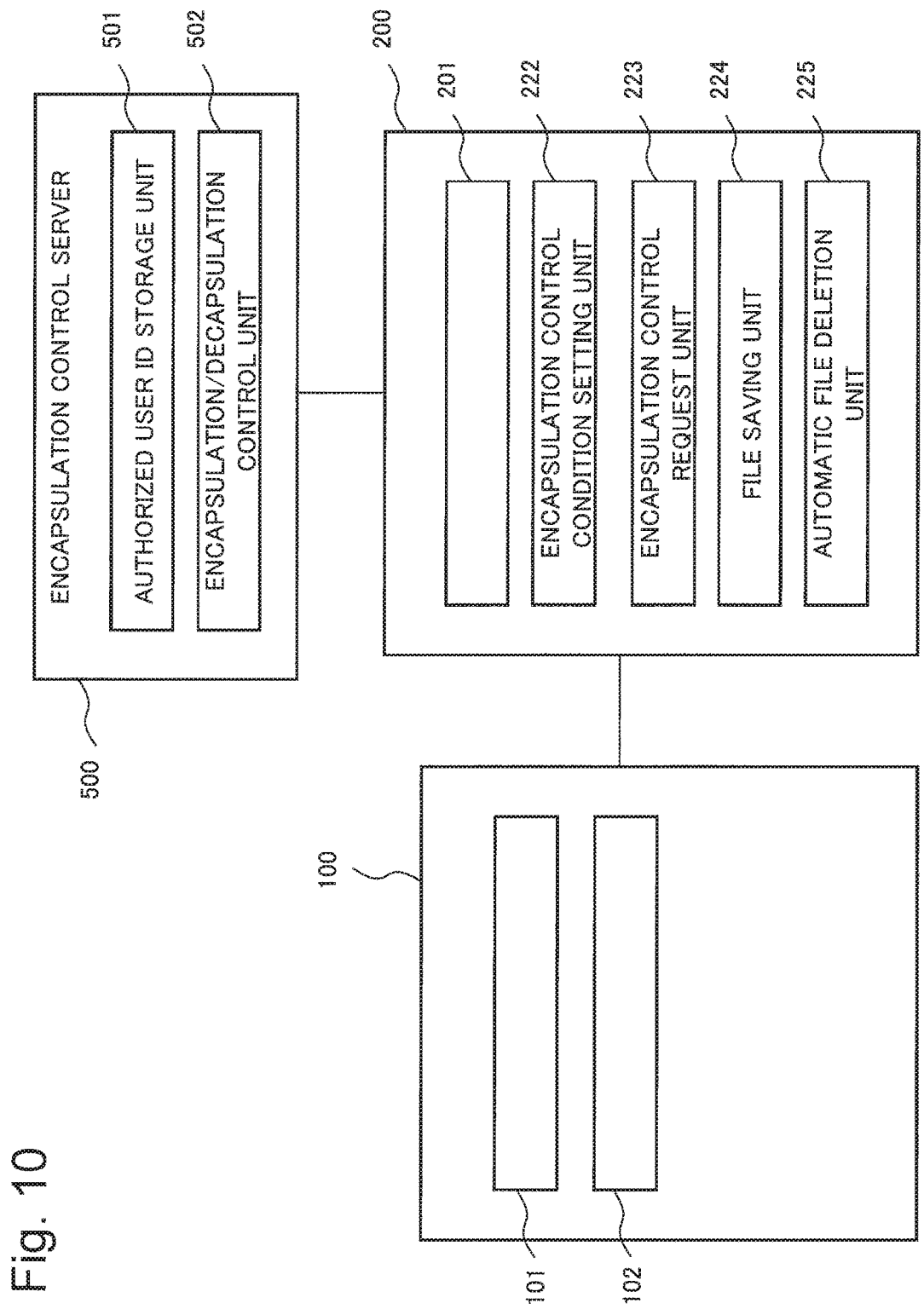
FIG. 10 is a block diagram illustrating a fifth exemplary embodiment of the present invention.

FIG. 10 is a block diagram illustrating a fourth exemplary embodiment of the present invention. The fifth exemplary embodiment implements a mechanism of executing both encapsulation and decapsulation.

The intranet 100 is equipped with a data storage unit 101 and an access rights information storage unit 102. These components are the same as the second to fourth exemplary embodiments. Further, the user terminal 200 is connected to the intranet 100. In addition, an encapsulation control server 500 is located on a network, such as the Internet or intranet. The encapsulation control server 500 is equipped with an authorized user ID storage unit 501 and an encapsulation/decapsulation control unit 502.

The encapsulation control server 500, in response to a request from the outside, encapsulates an original file, as well as, decapsulates an encapsulated file.

Further, the encapsulation control server 500 refers to the authorized user ID storage unit 501 and determines whether or not a user is authorized for use.

The user terminal 200 has an encapsulation control condition setting unit 222, an encapsulation control request unit 223, a file saving unit 224, and an automatic file deletion unit 225.

The encapsulation control condition setting unit 222 specifies which file to request processing for and whether the processing is encapsulation or decapsulation. Further, for encapsulation, the encapsulation control condition setting unit 222 specifies what kind of access rights to set.

The encapsulation control request unit 223, in accordance with the condition specified by the encapsulation control condition setting unit 222, requests encapsulation of an original file or decapsulation of an encapsulated file to the encapsulation control server 500. After performing authentication by referring to the encapsulation control server 500 and the authorized user ID storage unit 501, the encapsulation/decapsulation control unit 502 performs encapsulation or decapsulation processing. The file, which was returned after completion of the processing, is stored in the data storage unit 101 by the file saving unit 224. Then, upon completion of the saving, the source original file or the source encapsulated file is forcibly deleted by the automatic file deletion unit 225.

As the operations of encapsulation and decapsulation are the same as the second to fourth exemplary embodiments, the descriptions thereof are omitted.

As such, allowing execution of both encapsulation and decapsulation offers advantages, for example, as follows: First, a user uses an original file by executing decapsulation. As the original file remains as it is, the original file is reencapsulated after using the same. In the fifth exemplary embodiment, as deletion of the original file is automatically performed simultaneously with the encapsulation, the file is encapsulated except for a period, during which the original file is being used. Therefore, information can be securely retained.

Sixth Exemplary Embodiment

As described above, using the fifth exemplary embodiment allows users to use an original file 1 at will and encapsulate and store the file except for a period, during which the file is being used. However, users have trouble encapsulating files one by one, thus, there might be chances where users neglect encapsulation or overlook original files that are not encapsulated. Thus, a sixth exemplary embodiment provides a mechanism of automatically finding an original file, encapsulating it, and deleting the source original file.

Figure 11:
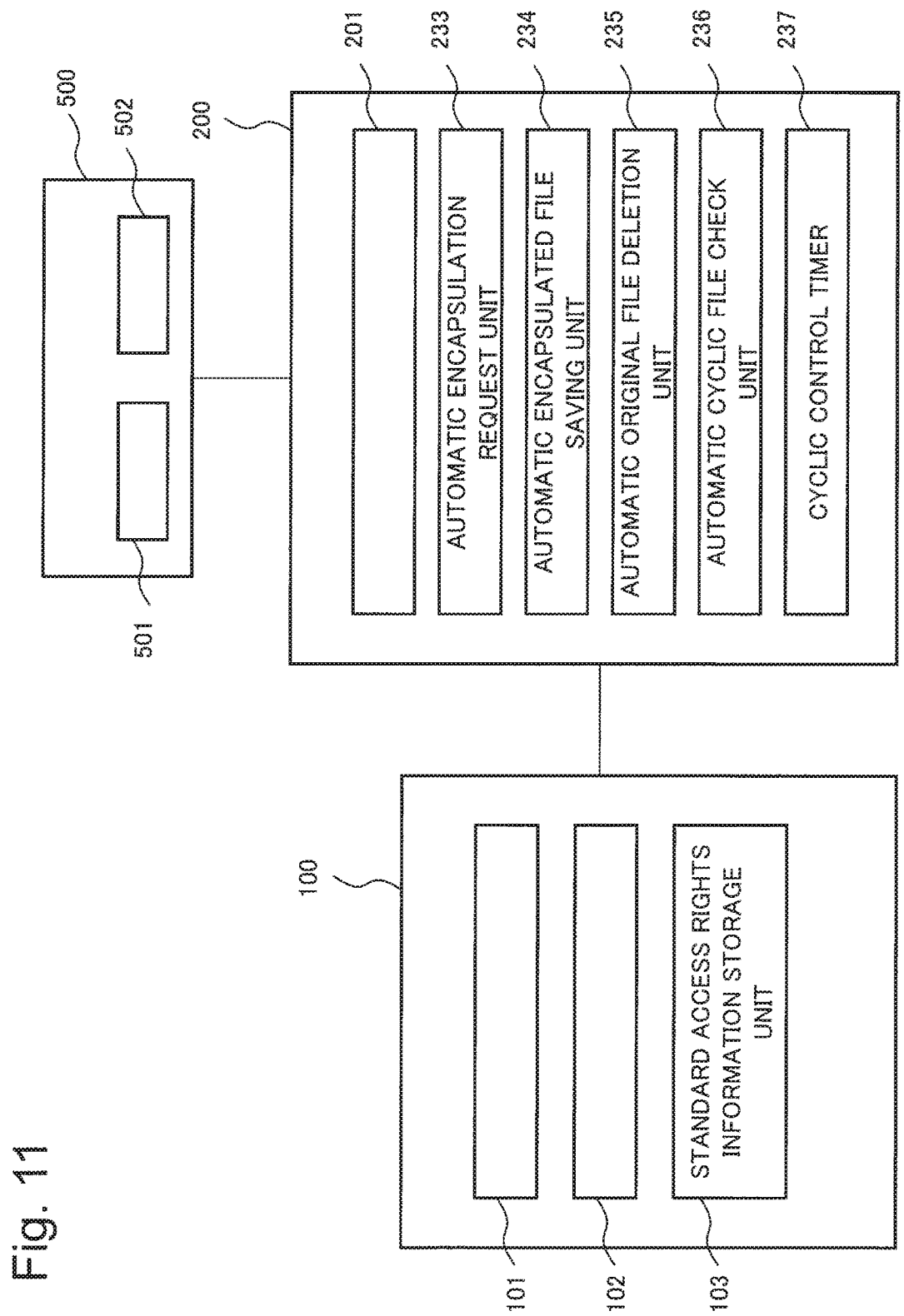
FIG. 11 is a block diagram illustrating a sixth exemplary embodiment of the present invention.

FIG. 11 is a block diagram illustrating a file management system of the sixth exemplary embodiment. The intranet 100 is equipped with a data storage unit 101, an access rights information storage unit 102, and a standard access rights information storage unit 103. Further, the user terminal 200 is connected to the intranet 100. The user terminal 200 has a user ID storage unit 201, an automatic encapsulation request unit 233, an automatic encapsulated file saving unit 234, an automatic original file deletion unit 235, an automatic cyclic file check unit 236, and a cyclic control timer 237. Further, an encapsulation control server 500 is located on a network, such as the Internet or intranet. The encapsulation control server 500 is equipped with an authorized user ID storage unit 501 and an encapsulation/decapsulation control unit 502. It should be noted that the encapsulation control server 500 can be replaced with the encapsulation server 300.

The standard access rights information storage unit 103 stores standard access rights information that is used when an original file is encapsulated. The standard access rights are access rights that have been defined beforehand as access rights, with which files are automatically encapsulated. For example, such as "employees of the company are permitted all operations" or "the creator is permitted all operations; others, read only" are possible.

The automatic cyclic file check unit 236 checks files stored in the data storage unit 101 one by one and, if an original file is detected, transmits the file name thereof to the automatic encapsulation request unit 233.

Having received the file name from the automatic cyclic file check unit 236, the automatic encapsulation request unit 233 requests, to the encapsulation control server 500, encapsulation of the original file. Here, the original file is retrieved from the data storage unit 101, the standard access rights information is retrieved from the standard access rights information storage unit 103, and the original file and the standard access rights information are transmitted, together with the encapsulation request, to the encapsulation control server 500. It should be noted that the user ID is transmitted before the encapsulation request so as to establish necessary authentication.

The automatic encapsulated file saving unit 234 saves the encapsulated file 2, which was returned from the encapsulation control server 500, in the same path as the source original file 1 in the data storage unit 101.

The automatic original file deletion unit 235, upon saving of the encapsulated file 2, automatically deletes the source original file 1. It should be noted that, in a configuration where the automatic encapsulated file saving unit 234 overwrites the source original file with the encapsulated file 2 with the same name, the automatic original file deletion unit 235 may not necessarily be provided.

The cyclic control timer 237 controls start and stop of the automatic cyclic file check unit 236 at a preset interval. The cyclic control timer 237 is set with two intervals, a start interval and a continuation interval that is an interval from start to stop, from the outside. The cyclic control timer 237 records the present time and starts the automatic cyclic file check unit 236 at each start interval. Then, when the time interval of the continuation interval comes, the operation of the automatic cyclic file check unit 236 is forcibly discontinued.

Figure 12:
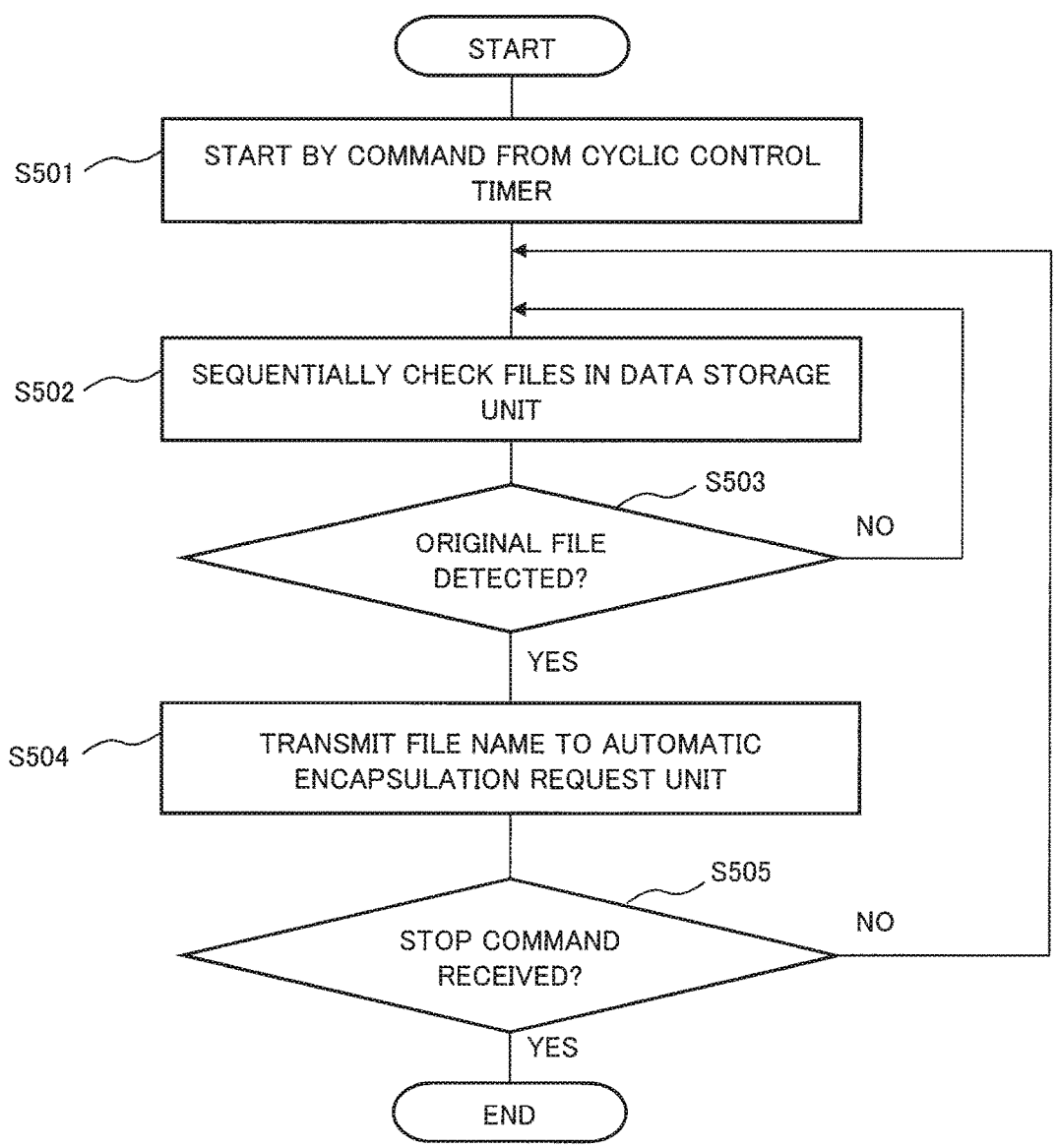
FIG. 12 is a flowchart illustrating an operation of the sixth exemplary embodiment of the present invention.

The following will describe the operation of the automatic cyclic file check unit 236. FIG. 12 is a flowchart illustrating an operation of the automatic cyclic file check unit 236. It should be noted that the signs of the respective units used in the description are the same as those of FIG. 11.

First, the automatic cyclic file check unit 236 starts by receiving a start command from the cyclic control timer 237 (S501). Next, files stored in the data storage unit are checked one by one (S502). If the checked file is not an original file (S503_NO), it proceeds to a check of the next file. If an original file is detected (S503_YES), the file name is transmitted to the automatic encapsulation request unit 233 (S504). If a stop command is received from the cyclic control timer 237, it stops (S505_YES). If there is no stop command (S505_NO), the automatic cyclic file check unit 236 returns to check files to check the next file. It should be noted that this example illustrates that the stop command from the cyclic control timer 237 is received after S504 (transmission of the file name to the automatic encapsulation request unit 233). However, the stop command is received at arbitrary timing and, thus, the automatic cyclic file check unit 236 stops at arbitrary timing.

The automatic cyclic file check unit 236 is configured as a program that permanently operates without ending, thus, if the user terminal 200 is a multi-task system, the task is preferably operated with lower priority so as not to interrupt the primary operation. The sixth exemplary embodiment employs a mechanism where the operation is temporarily discontinued at arbitrary timing by the function of the cyclic control timer 237. However, if the user terminal 200 is powerful enough that the automatic cyclic file check unit 236 running in background does not interrupt the primary operation, the interval may be set to infinite to let it always operate.

As described above, according to the sixth exemplary embodiment, original files 1 can be replaced with encapsulated files 2 without leaving any original files 1 out. Thus, information can be securely protected.

Seventh Exemplary Embodiment

If the user terminal 200 is a portable device, such as a smartphone and a tablet PC, increasing background programs accelerates battery consumption, which is not desirable from the standpoint of users. The seventh exemplary embodiment provides means that executes automatic encapsulation of files without troubling users for battery consumption.

Figure 13:
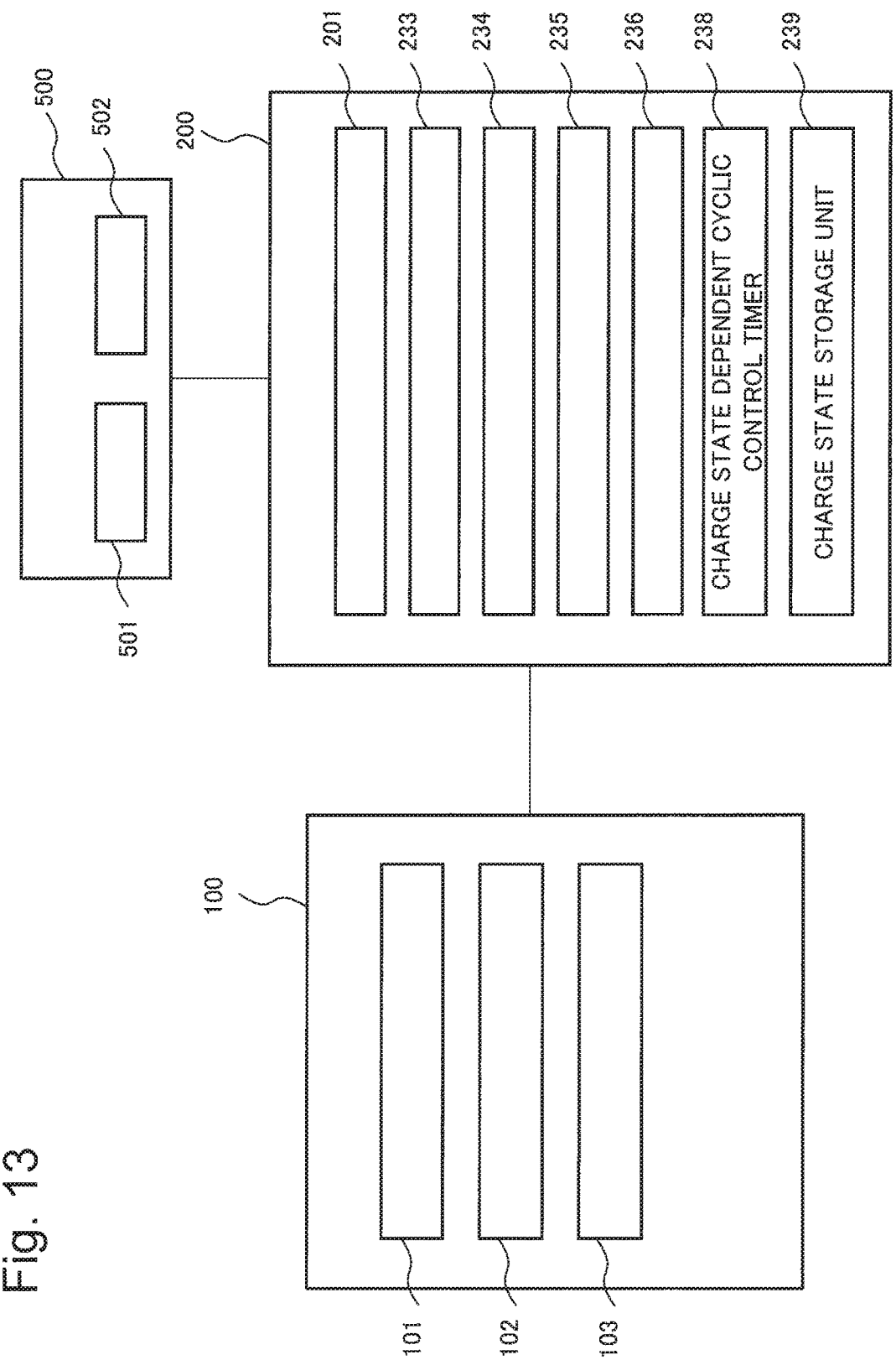
FIG. 13 is a block diagram illustrating a seventh exemplary embodiment of the present invention.

FIG. 13 is a block diagram illustrating the seventh exemplary embodiment. The user terminal 200 includes a charge state storage unit 239 in addition to the components of the sixth exemplary embodiment. Further, the cyclic control timer is replaced with a charge state dependent cyclic control timer 238 that controls cyclic check according to the charged state.

The charge state storage unit 239 constantly records whether the user terminal 200 is being charged. Then, if the charge processing is discontinued, an event "charge processing is discontinued" is generated as an interrupt event. In a typical implementation, these are realized by the control circuit (not shown) in the user terminal 200 and, at a program level, detected as an interrupt event.

The charge state dependent cyclic control timer 238 is set with two intervals, a start interval for start and a continuation interval that is an interval from start to end, from the outside. The charge state dependent cyclic control timer 238 records the present time, checks the charge state storage unit 239 at each start interval, then, starts the automatic cyclic file check unit 236 only when being charged. Then, it continues to operate until the time interval of the continuation interval comes. However, if an interrupt event of charge processing discontinuation is received from the charge state storage unit 239, the operation of the automatic cyclic file check unit 236 is forcibly discontinued.

As described above, according to the seventh exemplary embodiment, automatic encapsulation processing is performed only when the battery is being charged, diminishing the necessity of troubling about battery consumption caused by automatic encapsulation.

Eighth Exemplary Embodiment

Figure 14:
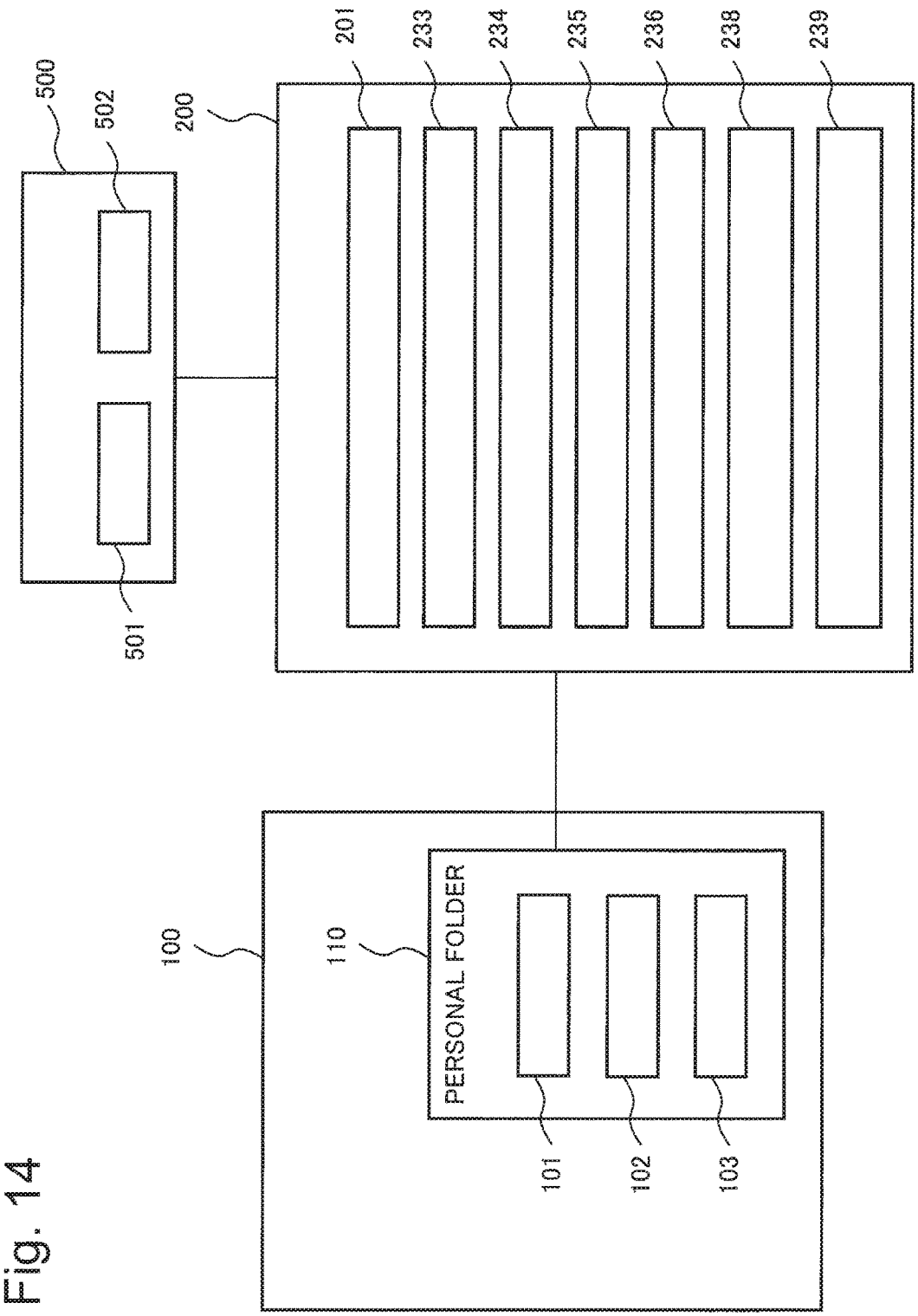
FIG. 14 is a block diagram illustrating an eighth exemplary embodiment of the present invention.

FIG. 14 is a block diagram illustrating an eighth exemplary embodiment of the present invention. In the eighth exemplary embodiment, automatic encapsulation processing is performed only for a personal folder that is provided in the intranet 100. For an automatic encapsulation mechanism, this example illustrates a mechanism, to which the seventh exemplary embodiment is applied. A personal folder 110 is provided in the intranet 100, and the personal folder 110 is equipped with a data storage unit 101, an access rights information storage unit 102, and a standard access rights information storage unit 103. Such an embodiment is preferable when the scale of the intranet is large, a personal folder is equipped in the intranet, and the folder is managed by a user. The operation is the same as the seventh exemplary embodiment.

Ninth Exemplary Embodiment

In the sixth to eighth exemplary embodiments, the data storage unit 101, access rights information storage unit 102, and standard access rights information storage unit 103 are located within the intranet 100. However, the same embodiments can be applied even when all these components are provided in the user terminal 200. This is because this configuration is substantially equivalent to the state where the user terminal 200 always connects with the intranet 100 in the first to seventh exemplary embodiments.

Figure 15:
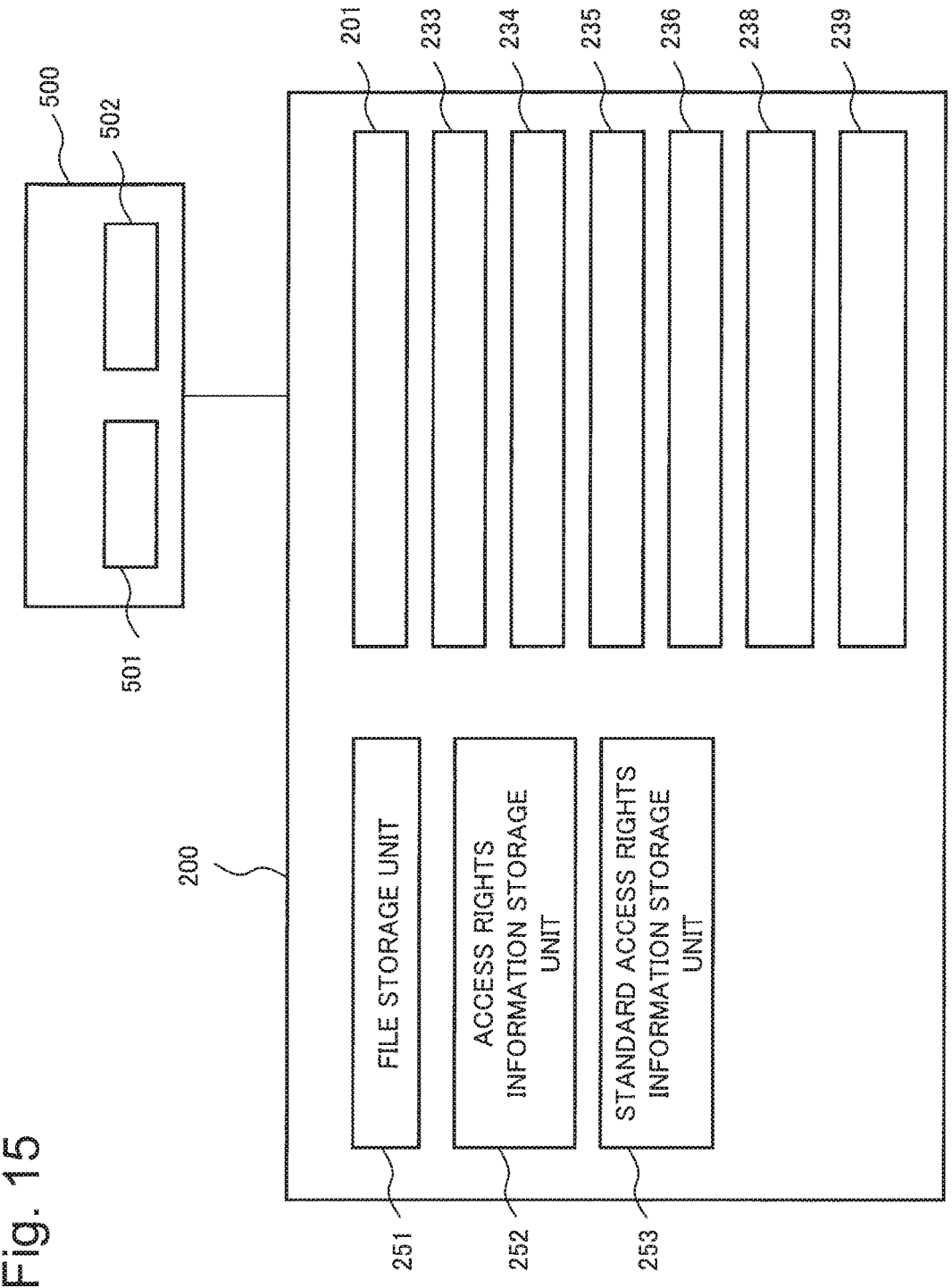
FIG. 15 is a block diagram illustrating a ninth exemplary embodiment of the present invention.

FIG. 15 is a block diagram illustrating a ninth exemplary embodiment. The user terminal 200 of the ninth exemplary embodiment is equipped with a data storage unit 251, an access rights information storage unit 252, and a standard access rights information storage unit 253 in addition to the components of the user terminal 200 of the seventh exemplary embodiment. The operation is the same as the seventh exemplary embodiment.

In the ninth exemplary embodiment, a user can encapsulate data retained in the user terminal 200 without omission, thereby enhancing security. Further, as in FIG. 15, with automatic encapsulation processing dependent on a charging state, encapsulation is automatically performed whenever a user charges the user terminal 200, which is very convenient.

It will be appreciated that other exemplary embodiments can be applied to the processing of encapsulation and decapsulation for the user terminal 200 of the ninth exemplary embodiment.

As above, the present invention has been described with the above-described exemplary embodiments as model examples. However, the present invention is not limited to the above-described exemplary embodiments. That is, the present invention can be applied to a variety of modes that can be understood by those skilled in the art within the scope of the present invention.

This application claims priority based on Japanese Patent Application No. 2013-198689 filed on Sep. 25, 2013, which application is incorporated herein in its entirety by disclosure.

REFERENCE SIGNS LIST

1 Original file
2 Encapsulated file
100 Intranet
101, 251 Data storage unit
102, 252 Access rights information storage unit
103, 253 Standard access rights information storage unit
191 Data storage means
200 User terminal
201 User ID storage unit
202 Encapsulation condition setting unit
203 Encapsulation request unit
204 Encapsulated file saving unit
205 Automatic original file deletion unit
212 Decapsulation condition setting unit
213 Decapsulation request unit
214 Original file saving unit
215 Automatic encapsulated file deletion unit
222 Encapsulation control condition setting unit
223 Encapsulation control request unit
224 File saving unit
225 Automatic file deletion unit
233 Automatic encapsulation request unit
234 Automatic encapsulated file saving unit
235 Automatic original file deletion unit
236 Automatic cyclic file check unit
237 Cyclic control timer
238 Charge state dependent cyclic control timer
239 Charge state storage unit
291 Encapsulation condition setting means
292 Encapsulation request means
293 Encapsulated file saving means
294 Automatic original file deletion means
300 Encapsulation server
301, 401, 501 Authorized user ID storage unit
302 Encapsulation control unit
391 Encapsulation control means
400 Decapsulation server
402 Decapsulation control unit
500 Encapsulation control server
502 Encapsulation/decapsulation control unit

What is claimed is:

1. A file management system comprising:
an intranet comprising data storage unit; and
an encapsulation server which generates an encapsulated file by collectively encrypting an original file and access rights information for the original file; and
a decapsulation server which can be accessed from the user terminal and retrieves the original file by decapsulating the encapsulated file; and
a user terminal which can access the intranet and the encapsulation server,
wherein
the encapsulation server comprises
an encapsulation control unit which receives the original file and the access rights information from the user terminal, generates the encapsulated file, and returns the encapsulated file to the user terminal, and
the user terminal comprises:
an encapsulation condition setting unit which sets an encapsulation condition;
an encapsulation request unit which requests encapsulation to the encapsulation server;
an encapsulated file saving unit which saves the returned encapsulated file in the data storage unit; and
an automatic file deletion unit which, upon saving of the encapsulated file, automatically deletes the original file that was stored in the file storage means,
the decapsulation server comprises
a decapsulation control unit which performs decapsulation when the user ID has access rights to the original file, and
the user terminal comprises:
a decapsulation request unit which requests decapsulation by transmitting the encapsulated file and the user ID to the decapsulation server; and
an original file saving unit which receives the original file and saves the original file in the data storage unit; and
an automatic encapsulated file deletion unit which, upon saving of the original file, automatically deletes the encapsulated file that was stored in the data storage unit.

2. The file management system according to claim 1, wherein the encapsulation release server comprises
an access rights determination unit which determines whether the user ID has access rights with permission for all operations for the encapsulated file by decrypting the encapsulated file and referring to access rights information in the encapsulated file.

3. The file management system according to claim 1, wherein the original file saving unit comprises
an original file overwrite unit which overwrites the encapsulated file with the original file with the same name as the encapsulated file.

4. The file management system according to claim 1, Wherein
the intranet comprises
a standard access rights information storage unit which stores standard access rights information, and
the user terminal comprises:
an automatic cyclic file check unit which detects the existence of the original file by cyclically checking the data storage unit; and
an automatic encapsulation request unit which, when the automatic cyclic file check unit has detected the original file,
automatically transmits the original file, the standard access rights information retrieved from the standard access rights information storage unit, and the user ID to the encapsulation server to request encapsulation.

5. The file management system according to claim 4, comprising
a cyclic control timer which starts and stops the cyclic check unit at a predetermined time interval.

6. The file management system according to claim 4, wherein the user terminal comprises:
a battery; a power receiving unit for charging the battery;
a power receiving state storage unit which stores a power receiving state of the power receiving unit; and
a power receiving state dependent cyclic control timer which starts the automatic cyclic file check unit when the power receiving state storage unit has detected received power and stops the automatic cyclic file check unit when the power receiving state storage unit has detected a break of the received power.

* * * * *